United States Patent [19]

Wolfrum et al.

[11] 4,450,777

[45] May 29, 1984

[54] PROCESS FOR REMOVING NOXIOUS SUBSTANCES CONTAINING FLUORINE AND/OR SULFUR FROM GASEOUS OR LIQUID MEDIA

[75] Inventors: Erhard Wolfrum, Düren; Manfred Erken, Bergheim-Niederaussem; Dietrich Böcker, Brühl, all of Fed. Rep. of Germany

[73] Assignee: Rheinische Braunkohlenwerke AG, Cologne, Fed. Rep. of Germany

[21] Appl. No.: 487,236

[22] Filed: Apr. 27, 1983

Related U.S. Application Data

[63] Continuation of Ser. No. 305,246, Sep. 24, 1981, abandoned.

[30] Foreign Application Priority Data

Sep. 27, 1980 [DE] Fed. Rep. of Germany ....... 3036504

[51] Int. Cl.³ .................... F23G 7/06; F23B 7/00
[52] U.S. Cl. .................... 110/342; 110/218; 210/660; 210/774; 210/915; 55/71; 55/73; 55/74
[58] Field of Search ............... 210/660, 681, 694, 774, 210/915; 110/218, 342, 343; 55/71, 73, 74

[56] References Cited

U.S. PATENT DOCUMENTS

| | | | |
|---|---|---|---|
| 3,373,085 | 3/1968 | Masciantonio | 210/694 |
| 3,823,676 | 7/1974 | Cook | 110/342 |
| 3,918,372 | 11/1975 | Schuster | 110/342 |
| 4,083,701 | 4/1978 | Noack | 55/73 |
| 4,111,755 | 9/1978 | Ban | 110/342 |
| 4,227,995 | 10/1980 | Sze | 208/251 H |
| 4,232,615 | 11/1980 | Brown | 110/342 |
| 4,262,610 | 4/1981 | Hein | 110/342 |
| 4,303,477 | 12/1981 | Schmidt | 110/342 |
| 4,312,280 | 1/1982 | Shearer | 110/342 |

FOREIGN PATENT DOCUMENTS 49-64255  6/1974  Japan .................... 210/915

*Primary Examiner*—Ernest G. Therkorn
*Attorney, Agent, or Firm*—Panitch, Schwarze, Jacobs & Nadel

[57] ABSTRACT

A process is provided for removing noxious pollutants containing sulfur and/or fluorine compounds from gaseous or liquid media by adsorption of the compounds on coke. The coke is produced by conventional processes from lignite (brown coal) containing alkaline ash compounds, particularly CaO and MgO as well as possibly $Na_2O$, $Al_2O_3$ and $K_2O$. The coke with adsorbed sulfur and/or fluorine pollutants is incinerated at temperatures selected from 700° C. and 1050° C. such that the pollutants combine chemically with the alkaline ash compounds so that the pollutants become bound in the coke ash rather than being emitted to the environment in the combustion gases.

6 Claims, 2 Drawing Figures

PROCESS FOR REMOVING NOXIOUS SUBSTANCES CONTAINING FLUORINE AND/OR SULFUR FROM GASEOUS OR LIQUID MEDIA

This is a continuation of application Ser. No. 305,246, filed Sept. 24, 1981, now abandoned.

BACKGROUND OF THE INVENTION

The invention concerns a process for removing noxious substances containing fluorine and/or sulfur from gaseous or liquid media by means of adsorption by coke and the subsequent incineration of the coke.

The removal of noxious substances (pollutants), especially pollutants containing sulfur, e.g., $H_2S$ and $SO_2$, as well as pollutants containing fluorine, e.g. $H_2F_2$, with as little emission as possible, gains ever increasing importance in the context of environmental protection. A known procedure is to adsorb pollutants in gases or liquids onto certain adsorption materials, such as activated charcoal (German Offenlegungsschrift No. 23 50 498) or onto specially treated coke (German Offenlegungsschrift No. 16 69 318). The further use of the activated charcoal and coke laden with pollutants is a problem, since on their regeneration for the purpose of reuse, the pollutants reach the gas or liquid phase and must be isolated yet again (German Offenlegungsschrift No. 19 42 519).

If adsorption material is used only once, it generally cannot be stored as waste for ecological reasons, since it is to be feared that the pollutants will desorb in time and leak into the environment. Nor can incineration of the laden activated charcoal be viewed as an expedient means of disposal which avoids ecological damage; since it is known that the retention capacity of activated charcoal for sulfur compounds diminishes drastically at temperatures above 300° C. (German Offenlegungsschrift No. 15 44 084), thus enabling them to escape as exhaust fumes.

At the basis of the invention lies the question of developing a procedure as described in the introduction which allows the laden coke to be disposed of without any appreciable emission of the pollutants with which the coke has been charged. In any event, it should be possible to render inactive a large enough proportion of the pollutants that a noticeable improvement of the environment can be achieved. Furthermore, the objective is that this be done in an economical way, and that the coke used be readily available.

BRIEF SUMMARY OF THE INVENTION

As a solution to this problem, the invention proposes that the coke produced from lignite (brown coal) containing alkaline ash components be used to adsorb the pollutants and that the degree to which the coke is charged with pollutants is selected such that incineration at temperatures between 700° C. and 1100° C. will cause the pollutants to combine chemically with the alkaline components of the ash. In order to achieve optimal results, the invention further proposes that the charging of the adsorption coke with pollutants be dependent on the amount of alkaline components in the ash such that the proportion of pollutants is no greater than the corresponding stoichiometric ratios.

DETAILED DESCRIPTION OF PREFERRED EMBODIMENTS

Figure 1:
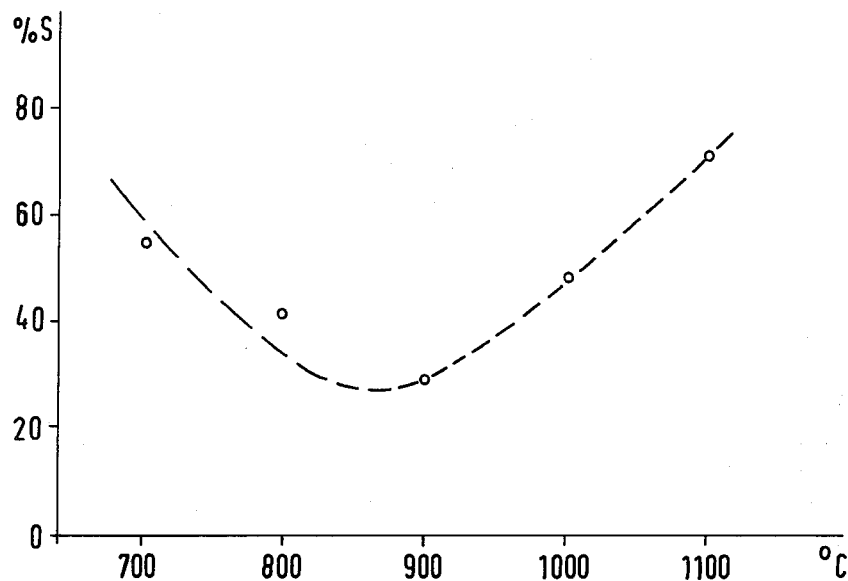
FIG. 1 is a graph showing the proportion of sulfur (in %) emitted in the combustion gases in relation to the combustion temperature (in °C.).

Coke may be obtained by means of a conventional thermal distillation process, for example by using a hearth-type furnace. However, it is also possible to use coke residue from gasification processes for this purpose.

It is evident that the combining capacity of the coke or its alkaline ash component quantitatively depends on the amount of the latter. The greater the proportion of the alkaline ash component, the greater is the combining capacity. One special feature of the invention is that this can be predetermined with little difficulty through appropriate procedures during the production of the coke. Thus, it is possible to raise the ash content during regular coke production, especially in a hearth-furnace, by varying the degree of combustion, i.e., the burning of the solid carbon. In the case of the residue coke from gasification processes, the ash content depends on the degree of carbon gasification.

On the other hand, since the absorption capacity of the coke is essentially due to the large surface area of its carbon, it may be expedient during the coke production to select an optimal balance between the charge capacity on the one hand and the combining capacity on the other. However, this will not always be necessary, and in some instances might depend on the amount of coke available and/or the particular purpose for which it is to be incinerated. A special advantage of the invention lies in the fact that it is not only possible to transform the abovementioned pollutants, by using the alkaline ash components, into stable compounds with the effect that the resulting ash can easily be stored; of even greater importance is the fact that the laden coke might, for example, be economically employed in the production of electrical energy, particularly, since the temperatures which must be maintained during incineration in order to achieve the desired effect pose no technical problems.

For a high proportion of fluorine in the adsorbed pollutants, combustion of the laden coke should take place at temperatures of between 750° C. and 850° C. Should the pollutants contain a high proportion of sulfur compounds, combustion will be effectively conducted in a temperature range of 850° C. to 950° C. Depending on the permissible emission levels, other incineration temperatures are of course possible.

The coke to be utilized for the procedure according to the invention does not have to be activated although it is perfectly possible to do so if necessary. The manner in which the coke is laden with the pollutants from gaseous and liquid media occurs according to known procedures. Even the subsequent incineration of the coke can be conducted conventionally in conventional retort facilities.

If the lignite used in the production of the coke contains sulfur, a portion of the alkaline ash components of the coal will already be combined chemically with the sulfur in the coal, thus leaving that portion unavailable for the combining with the pollutants to be adsorbed by the coke. Therefore, it is generally expedient to use lignite with as low a sulfur content as possible. The alkaline compounds in question will normally be mainly CaO, MgO and on occasion $Na_2O$, $Al_2O_3$ and $K_2O$ as well. Usually these ash compounds are so finely distributed in the coal, and in the coke produced from it, that combustion brings about the desired reaction between the pollutants and the alkaline compounds and thereby, to a great extent, the binding of the pollutants. Consequently, if the quantitative relationship between the noxious substances and the alkaline components of the ash is in stoichiometric correspondence, only a very minute portion of the noxious substances will desorb during combustion.

Figure 2:
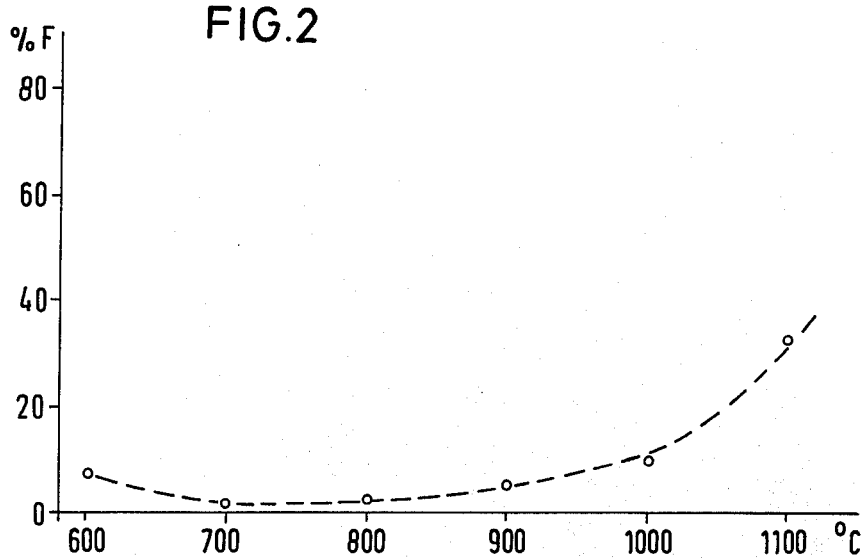
FIG. 2 is a graph showing the proportion of fluorine (in %) emitted in the combustion gases in relation to the combustion temperature (in °C.).

Results attainable during combustion of coke laden with pollutants containing sulfur are presented in FIG. 1. It shows that at optimal combustion temperatures, only a minute amount of the sulfur in the coke was desorbed into the exhaust fumes. FIG. 2 shows results attainable when incinerating coke laden with pollutants containing fluorine. By keeping within an optimal temperature range during combustion, a surprisingly small amount of fluorine is emitted into the exhaust fumes. This is an extraordinarily advantageous result in view of the burden placed on the environment due to fluorine containing exhaust fumes.

Based on the facts explained above, a specialist may easily calculate the amount of coke needed to adsorb the given sulfur or fluorine content, e.g. in smoke or other exhaust fumes, in order to adjust to the permissible or desired level of emission during the incineration of the coke.

The demonstration below by way of example based on test results shows the binding capacity which is attainable with the aid of ligneous coke used according to the process of the invention. Calculations were conducted on an exhaust gas containing sulfur dioxide and an exhaust gas containing fluorine. The two different exhaust gases with 9% by volume of sulfur oxide and 0.5% by volume of fluorine, respectively, were scrubbed by means of adsorption filters made of fine ligneous coke.

After adsorption, the residual gases contained 0.02% sulfur oxide by volume and $2 \times 10^{-3}\%$ fluorine by volume, respectively. This example of adsorption purification of gas required 9.85 kg ligneous coke (dry basis) per cubic meter (standard conditions) of gas containing $SO_2$; gas containing fluorine required 0.84 kg coke (dry basis) per cubic meter of gas to be scrubbed. After adsorption of the substances contained in the exhaust gases, the cokes contained 1.6% (by weight) of sulfur and 1.0% (by weight) of fluorine, respectively, calcualted on a dry basis.

Incineration of the coke laden with the pollutants according to the process in the case of pollutants containing sulfur (fluorine) was conducted at 900° C. (800°). Under these conditions, about 70% of the sulfur (by weight) and 95% of the fluorine (by weight) were bound in the ash. The minimal amount of air required amounted to 7.4 m³ of air (standard conditions) per kg of coke containing fluorine or sulfur. Gases emitted during combustion contained about 0.04% $SO_2$ (by volume) in the case of pollutants containing sulfur, and about 0.01% fluorine (by volume) for pollutants containing fluorine.

After incineration, in both cases, about 0.11 kg of ash remained per kg of coke containing pollutants.

By using even larger amounts of adsorption coke, a further reduction in the amount of pollutants in the residual gas is possible without a problem.

Should the charge on the coke be a mixture of pollutants containing both sulfur and fluorine, the choice of the incineration temperature will depend on the proportion of the two components in the pollutants. If either of the two components occurs as a trace, the incineration temperature will normally be selected in such a way as to minimize the desorption of the component that represents the greater proportion. On the other hand, i.e., with roughly equal proportions, it is expedient to choose a mean temperature in order to achieve an optimum with regards to desorption of the two components of the pollutants.

It is also possible to remove other pollutants in the same manner as long as the same chemical process is effected when the pollutants combine with the coke ash during incineration.

The present invention may be embodied in other specific forms without departing from the spirit or essential attributes thereof and, accordingly, reference should be made to the appended claims, rather than to the foregoing specification, as indicating the scope of the invention.

We claim:

1. A process for removing pollutants containing fluorine and/or sulfur from gaseous or liquid media by adsorping the pollutants on coke and subsequently incinerating the coke, characterized in that the coke to be charged with pollutants is produced from lignite (brown coal) inherently containing alkaline ash compounds finely distributed therein, and the degree to which the coke is charged is determined such that the subsequent combustion of the coke at temperatures between 700 degrees and 1050 degrees Centigrade causes the pollutants to be bound by chemical combination with the alkaline ash components in the ash.

2. A process according to claim 1 wherein the degree of charging of the coke with the pollutants is selected as a function of the amount of the alkaline component in the ash, such that the proportion of pollutants is no greater than the corresponding stoichiometric ratios.

3. A process according to claim 2 wherein for a high proportion of fluorine in the adsorbed pollutants the combustion of the charged coke is conducted at temperatures between 750 degrees and 850 degrees Centigrade.

4. A process according to claim 2 wherein for a high proportion of sulfur in the adsorbed pollutants the combustion of the charged coke is conducted at temperatures between 850 degrees and 950 degrees Centigrade.

5. A process according to claim 1 wherein for a high proportion of fluorine in the adsorbed pollutants the combustion of the charged coke is conducted at temperatures between 750° and 850° C.

6. A process according to any of claim 1 wherein for a high proportion of sulfur in the adsorbed pollutants the combustion of the charged coke is conducted at temperatures between 850° and 950° C.

* * * * *